United States Patent
Cordes et al.

(10) Patent No.: US 9,940,133 B2
(45) Date of Patent: *Apr. 10, 2018

(54) OPERATION OF A MULTI-SLICE PROCESSOR IMPLEMENTING SIMULTANEOUS TWO-TARGET LOADS AND STORES

(71) Applicant: International Business Machines Corporation, Armonk, NY (US)

(72) Inventors: Robert A. Cordes, Austin, TX (US); David A. Hrusecky, Cedar Park, TX (US); Jennifer L. Molnar, Cedar Park, TX (US); Jose A. Paredes, Austin, TX (US); Brian W. Thompto, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/219,638

(22) Filed: Jul. 26, 2016

(65) Prior Publication Data
US 2017/0357508 A1  Dec. 14, 2017

Related U.S. Application Data (63) Continuation of application No. 15/180,838, filed on Jun. 13, 2016.

(51) Int. Cl.
*G06F 12/08* (2016.01)
*G06F 9/30* (2018.01)
(Continued)

(52) U.S. Cl.
CPC ...... *G06F 9/30043* (2013.01); *G06F 12/0811* (2013.01); *G06F 12/0875* (2013.01); *G06F 2212/283* (2013.01); *G06F 2212/452* (2013.01)

(58) Field of Classification Search
CPC ............ G06F 9/30043; G06F 12/0811; G06F 12/0875; G06F 2212/283; G06F 2212/4552

See application file for complete search history.

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

Anonymous, "A Novel Data Prefetch Method Under Heterogeneous Architecture", IP.com Prior Art Database Technical Disclosure No. 000224167 (online), Dec. 2012, 14 pages, URL: http://ip.com/IPCOM/000224167.

(Continued)

*Primary Examiner* — Reginald G Bragdon
*Assistant Examiner* — Edward Wang
(74) *Attorney, Agent, or Firm* — Brandon C. Kennedy; Robert R. Williams; Kennedy Lenart Spraggins LLP (57) ABSTRACT

Operation of a multi-slice processor that includes a plurality of execution slices and a load/store superslice, where the load/store superslice includes a set predict array, a first load/store slice, and a second load/store slice. Operation of such a multi-slice processor includes: receiving a two-target load instruction directed to the first load/store slice and a store instruction directed to the second load/store slice; determining a first subset of ports of the set predict array as inputs for an effective address for the two-target load instruction; determining a second subset of ports of the set (Continued)

predict array as inputs for an effective address for the store instruction; and generating, in dependence upon logic corresponding to the set predict array that is less than logic implementing an entire load/store slice, output for performing the two-target load instruction in parallel with generating output for performing the store instruction.

6 Claims, 5 Drawing Sheets

(51) Int. Cl.
*G06F 12/0875* (2016.01)
*G06F 12/0811* (2016.01)

(56) References Cited

U.S. PATENT DOCUMENTS

| | | |
|---|---|---|
| 5,095,424 A | 3/1992 | Woffinden et al. |
| 5,471,593 A | 11/1995 | Branigin |
| 5,475,856 A | 12/1995 | Kogge |
| 5,553,305 A | 9/1996 | Gregor et al. |
| 5,630,149 A | 5/1997 | Bluhm |
| 5,680,597 A | 10/1997 | Kumar et al. |
| 5,822,602 A | 10/1998 | Thusoo |
| 5,909,588 A | 6/1999 | Fujimura et al. |
| 5,913,048 A | 6/1999 | Cheong et al. |
| 5,996,068 A | 11/1999 | Dwyer, III et al. |
| 6,021,485 A | 2/2000 | Feiste et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,098,166 A | 8/2000 | Leibholz et al. |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,212,544 B1 | 4/2001 | Borkenhagen et al. |
| 6,237,081 B1 | 5/2001 | Le et al. |
| 6,286,027 B1 | 9/2001 | Dwyer, III et al. |
| 6,311,261 B1 | 10/2001 | Chamdani et al. |
| 6,336,168 B1 | 1/2002 | Frederick, Jr. et al. |
| 6,336,183 B1 | 1/2002 | Le et al. |
| 6,356,918 B1 | 3/2002 | Chuang et al. |
| 6,381,676 B2 | 4/2002 | Aglietti et al. |
| 6,418,513 B1 | 7/2002 | Arimilli et al. |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,564,315 B1 | 5/2003 | Keller et al. |
| 6,654,876 B1 | 11/2003 | Le et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,847,578 B2 | 1/2005 | Ayukawa et al. |
| 6,868,491 B1 | 3/2005 | Moore |
| 6,883,107 B2 | 4/2005 | Rodgers et al. |
| 6,901,504 B2 | 5/2005 | Luick |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,100,157 B2 | 8/2006 | Collard |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,386,704 B2 | 6/2008 | Schulz et al. |
| 7,395,419 B1 | 7/2008 | Gonion |
| 7,398,374 B2 | 7/2008 | Delano |
| 7,401,188 B2 | 7/2008 | Matthews |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,509,484 B1 | 3/2009 | Golla et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,669,035 B2 | 2/2010 | Young et al. |
| 7,669,036 B2 | 2/2010 | Brown et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,889,204 B2 | 2/2011 | Hansen et al. |
| 7,890,735 B2 | 2/2011 | Tran |
| 7,926,023 B2 | 4/2011 | Okawa et al. |
| 7,949,859 B2 | 5/2011 | Kalla et al. |
| 7,975,134 B2 | 7/2011 | Gonion |
| 7,987,344 B2 | 7/2011 | Hansen et al. |
| 8,028,152 B2 | 9/2011 | Glew |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,131,942 B2 | 3/2012 | Harris et al. |
| 8,131,980 B2 | 3/2012 | Hall et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,166,282 B2 | 4/2012 | Madriles et al. |
| 8,184,686 B2 | 5/2012 | Wall et al. |
| 8,219,783 B2 | 7/2012 | Hara |
| 8,219,787 B2 | 7/2012 | Lien et al. |
| 8,243,866 B2 | 8/2012 | Huang et al. |
| 8,250,341 B2 | 8/2012 | Schulz et al. |
| 8,271,765 B2 | 9/2012 | Bose et al. |
| 8,325,793 B2 | 12/2012 | Zhong |
| 8,335,892 B1 | 12/2012 | Minkin et al. |
| 8,386,751 B2 | 2/2013 | Ramchandran et al. |
| 8,402,256 B2 | 3/2013 | Arakawa |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,521,992 B2 | 8/2013 | Alexander et al. |
| 8,555,039 B2 | 10/2013 | Rychlik |
| 8,654,884 B2 | 2/2014 | Kerr |
| 8,656,401 B2 | 2/2014 | Venkataramanan et al. |
| 8,683,182 B2 | 3/2014 | Hansen et al. |
| 8,713,263 B2 | 4/2014 | Bryant |
| 8,850,121 B1 | 9/2014 | Ashcraft et al. |
| 8,929,496 B2 | 1/2015 | Lee et al. |
| 8,935,513 B2 | 1/2015 | Guthrie et al. |
| 8,966,232 B2 | 2/2015 | Tran |
| 8,984,264 B2 | 3/2015 | Karlsson et al. |
| 9,069,563 B2 | 6/2015 | Konigsburg et al. |
| 9,207,995 B2 | 12/2015 | Boersma et al. |
| 9,223,709 B1 | 12/2015 | O'Bleness et al. |
| 9,519,484 B1 | 12/2016 | Stark |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 2002/0078302 A1 | 6/2002 | Favor |
| 2002/0194251 A1 | 12/2002 | Richter et al. |
| 2003/0120882 A1 | 6/2003 | Granston et al. |

(56) References Cited

U.S. PATENT DOCUMENTS

| | | |
|---|---|---|
| 2003/0163669 A1 | 8/2003 | Delano |
| 2003/0182537 A1 | 9/2003 | Le et al. |
| 2004/0111594 A1 | 6/2004 | Feiste et al. |
| 2004/0162966 A1 | 8/2004 | Webb, Jr. et al. |
| 2004/0172521 A1 | 9/2004 | Hooker et al. |
| 2004/0181652 A1 | 9/2004 | Ahmed et al. |
| 2004/0216101 A1 | 10/2004 | Burky et al. |
| 2005/0060518 A1 | 3/2005 | Augsburg et al. |
| 2006/0095710 A1 | 5/2006 | Pires Dos Reis Moreira et al. |
| 2006/0106923 A1 | 5/2006 | Balasubramonian et al. |
| 2007/0022277 A1 | 1/2007 | Iwamura et al. |
| 2007/0079303 A1 | 4/2007 | Du et al. |
| 2007/0101102 A1 | 5/2007 | Dierks, Jr. et al. |
| 2007/0180221 A1 | 8/2007 | Abernathy et al. |
| 2007/0204137 A1 | 8/2007 | Tran |
| 2008/0098260 A1 | 4/2008 | Okawa et al. |
| 2008/0104375 A1* | 5/2008 | Hansen ............... G06F 9/30014 712/220 |
| 2008/0133885 A1 | 6/2008 | Glew |
| 2008/0162895 A1 | 7/2008 | Luick |
| 2008/0270749 A1 | 10/2008 | Ozer et al. |
| 2008/0307182 A1 | 12/2008 | Arimilli et al. |
| 2008/0313424 A1 | 12/2008 | Gschwind |
| 2009/0037698 A1 | 2/2009 | Nguyen |
| 2009/0113182 A1 | 4/2009 | Abernathy et al. |
| 2009/0198921 A1 | 8/2009 | Chen et al. |
| 2009/0300319 A1* | 12/2009 | Cohen ................. G06F 12/0846 711/207 |
| 2010/0100685 A1 | 4/2010 | Kurosawa et al. |
| 2010/0191940 A1 | 7/2010 | Mejdrich et al. |
| 2012/0060016 A1 | 3/2012 | Eichenberger et al. |
| 2012/0066482 A1 | 3/2012 | Gonion |
| 2012/0110271 A1 | 5/2012 | Boersma et al. |
| 2012/0246450 A1 | 9/2012 | Abdallah |
| 2014/0025933 A1 | 1/2014 | Venkataramanan et al. |
| 2014/0075159 A1 | 3/2014 | Frigo et al. |
| 2014/0215189 A1 | 7/2014 | Airaud et al. |
| 2014/0223144 A1 | 8/2014 | Heil et al. |
| 2014/0244239 A1 | 8/2014 | Nicholson et al. |
| 2014/0281408 A1 | 9/2014 | Zeng |
| 2015/0121010 A1 | 4/2015 | Kaplan et al. |
| 2015/0134935 A1 | 5/2015 | Blasco |
| 2015/0324204 A1 | 11/2015 | Eisen et al. |
| 2015/0324205 A1 | 11/2015 | Eisen et al. |
| 2015/0324206 A1 | 11/2015 | Eisen et al. |
| 2015/0324207 A1 | 11/2015 | Eisen et al. |
| 2016/0070571 A1 | 3/2016 | Boersma et al. |
| 2016/0070574 A1 | 3/2016 | Boersma et al. |
| 2016/0092231 A1 | 3/2016 | Chu et al. |
| 2016/0092276 A1 | 3/2016 | Chu et al. |
| 2016/0202986 A1 | 7/2016 | Ayub et al. |
| 2016/0202988 A1 | 7/2016 | Ayub et al. |
| 2016/0202989 A1 | 7/2016 | Eisen et al. |
| 2016/0202990 A1 | 7/2016 | Brownscheidle et al. |
| 2016/0202991 A1 | 7/2016 | Eisen et al. |
| 2016/0202992 A1 | 7/2016 | Brownscheidle et al. |
| 2017/0168837 A1 | 6/2017 | Eisen et al. |
| 2017/0255465 A1 | 9/2017 | Chadha et al. |
| 2017/0277542 A1 | 9/2017 | Fernsler et al. |
| 2017/0277543 A1 | 9/2017 | McGlone et al. |
| 2017/0300328 A1 | 10/2017 | Cordes et al. |

FOREIGN PATENT DOCUMENTS

| | | |
|---|---|---|
| CN | 101876892 A | 11/2010 |
| CN | 102004719 A | 4/2011 |
| EP | 1212680 B1 | 7/2007 |
| GB | 2356324 A | 5/2001 |
| GB | 2356324 B | 10/2001 |
| JP | 2009157887 A | 7/2009 |
| WO | WO 2015/067118 A1 | 5/2015 |

OTHER PUBLICATIONS

Anonymous, "Method and System for Predicting Performance Trade-Offs During Critical Path Execution in a Processor", IP.com Prior Art Database Technical Disclosure No. 000223340 (online), Nov. 2012, 7 pages, URL: http://ip.com/IPCOM/000223340.

IBM, "Using a mask to block the wakeup of dependents of already-issued instructions", An IP.com Prior Art Database Technical Disclosure (online), IP.com No. 000193322, URL: http://ip.com/IPCOM/000193322, dated Feb. 18, 2010, 2 pages.

Anonymous, "Fast wakeup of load dependent instructions by a select bypass", An IP.com Prior Art Database Technical Disclosure (online), IP.com No. 000216900, URL: http://ip.com/IPCOM/000216900, dated Apr. 23, 2012, 2 pages.

Kalla, et al., "IBM Power5 Chip: A Dual-Core Multithreaded Processor", IEEE Micro, vol. 24, No. 2, Mar. 2004, pp. 40-47, IEEE Xplore Digital Library (online), DOI: 10.1109/MM.2004.1289290.

Mathis et al., "Characterization of simultaneous multithreading (SMT) efficiency in POWER5", IBM Journal of Research and Development, Jul. 2005, pp. 555-564, vol. 49, No. 4/5, International Business Machines Corporation, Armonk, NY.

Sha et al., "Scalable Store-Load Forwarding via Store Queue Index Prediction", Proceedings of the 38th Annual IEEE/ACM International Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

ROC920150423US2, Appendix P; List of IBM Patent or Applications Treated as Related, Sep. 29, 2016, 2 pages.

Anonymous, "Un-Aligned Store Handling in a Multi-Slice Microprocessor", An IP.com Prior Art Database Technical Disclosure (online), Oct. 2015, 2 pages, IP.com No. IPCOM000243946D, URL: https://ip.com/IPCOM/000243946.

Ware et al., "Improving Power and Data Efficiency with Threaded Memory Modules", International Conference on Computer Design, Oct. 2006, pp. 417-424, IEEE Xplore Digital Library (online), DOI: 10.1109/ICCD.2006.4380850, San Jose, CA.

U.S. Appl. No. 15/152,257, to Sundeep Chadha et al., entitled, *Operation Of A Multi-Slice Processor Implementing A Load/Store Unit Maintaining Rejected Instructions*, assigned to International Business Machines Corporation, 37 pages, filed May 11, 2016.

U.S. Appl. No. 15/180,838, to Robert A. Cordes et al., entitled, *Operation Of A Multi-Slice Processor Implementing Simultaneous Two-Target Loads And Stores*, assigned to International Business Machines Corporation, 37 pages, filed Jun. 13, 2016.

U.S. Appl. No. 15/193,338, to Richard J. Elickemeyer et al., entitled, *Managing A Divided Load Reorder Queue*, assigned to International Business Machines Corpoation, 35 pages, filed Jun. 27, 2016.

U.S. Appl. No. 15/230,532, to Sundeep Chadha et al., entitled, *Flush Avoidance In A Load Store Unit*, assigned to International Business Machines Corporation, 37 pages, filed Aug. 8, 2016.

U.S. Appl. No. 15/221,035, to Sundeep Chadha et al., entitled, *Operation Of A Multi-Slice Processor Implementing A Load/Store Unit Maintaining Rejected Instructions*, assigned to International Business Machines Corporation, 37 pages, filed Jul. 27, 2016.

Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.

Anonymous, *Method and system for Implementing "Register Threads" in a Simultaneously-Multithreaded (SMT) Processor Core*, an IP.com Prior Art Database Technical Disclosure, IP.com No. IPCOM000199825D IP.com Electronic Publication: Sep. 17, 2010 pp. 1-4 <http://ip.com/IPCOM/000199825>.

Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.

Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.

(56) References Cited

OTHER PUBLICATIONS

Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-765, vol. 1685, Spring Berlin Heidelberg, Toulouse, France.

Pechanek et al., *The ManArray Embedded Processor Architecture*, Proceedings of the 26 Euromicro Conference, IEEE Computer Society, Sep. 5-7, 2000, pp. 348-355, vol. 1, Maastricht.

Anonymous, *Precise Merging Translation Queue in a Slice-Based Processor*, An IP.com Prior Art Database Technical Disclosure, IP.com No. IPCOM000249317D IP.com Electronic Publication: Feb. 16, 2017, pp. 1-3. <https://priorar.ip.com/IPCOM/000249317>.

ROC920150423US2, Appendix P; List of IBM Patent or Applications Treated as Related, Oct. 18, 2017, 2 pages.

International Search Report and Written Opinion, PCT/IB2015/052741, dated Oct. 9, 2015, 10.

\* cited by examiner

OPERATION OF A MULTI-SLICE PROCESSOR IMPLEMENTING SIMULTANEOUS TWO-TARGET LOADS AND STORES

CROSS-REFERENCE TO RELATED APPLICATION

This application is a continuation application of and claims priority from U.S. patent application Ser. No. 15/180,838, filed on Jun. 13, 2016.

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include a load/store superslice, where a load/store superslice includes a set predict array, a first load/store slice, and a second load/store slice. Operation of such a multi-slice processor includes: receiving a two-target load instruction directed to the first load/store slice and a store instruction directed to the second load/store slice; determining a first subset of ports of the set predict array as inputs for an effective address for the two-target load instruction; determining a second subset of ports of the set predict array as inputs for an effective address for the store instruction; and generating, in dependence upon logic corresponding to the set predict array that is less than logic implementing an entire load/store slice, output for performing the two-target load instruction in parallel with generating output for performing the store instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
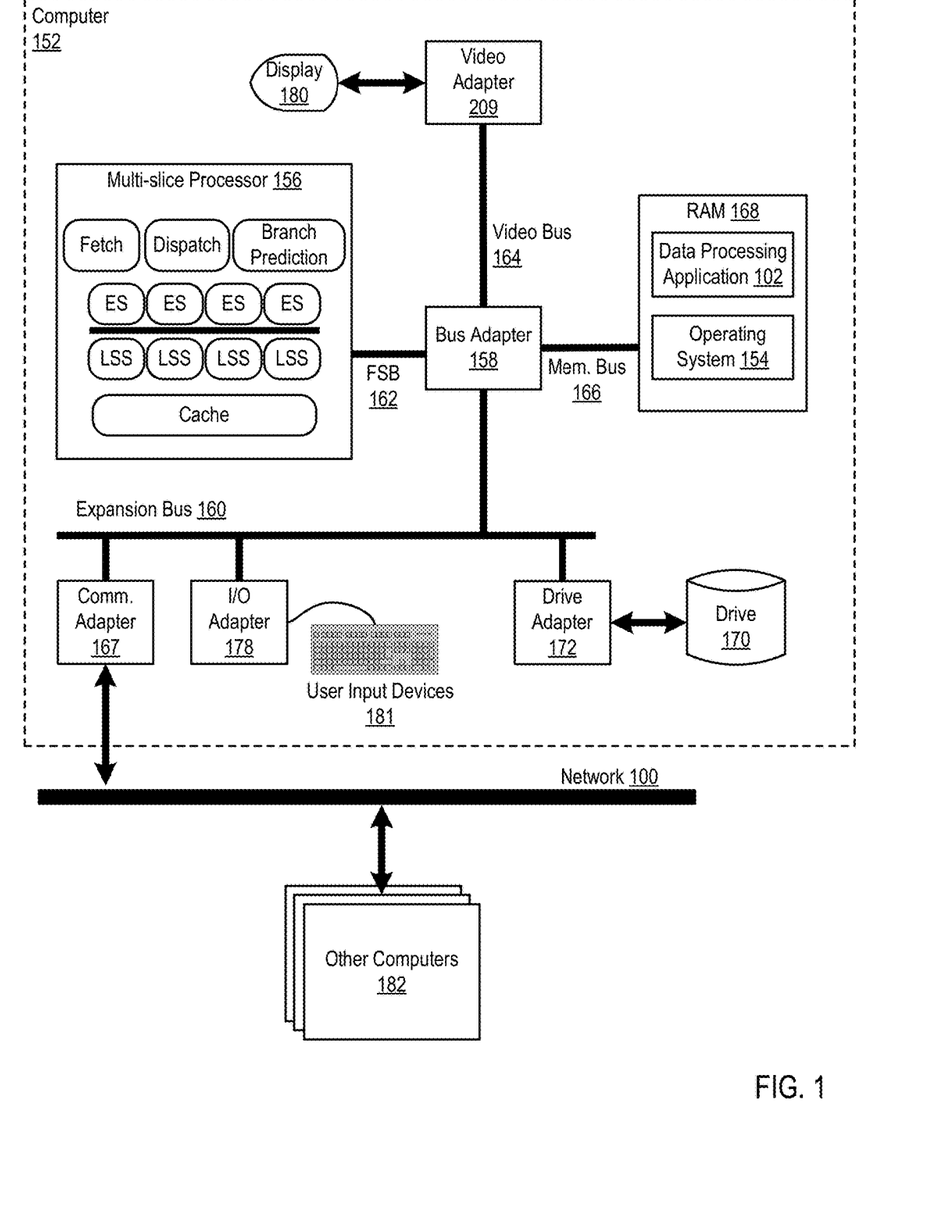
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('ISS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice.

In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
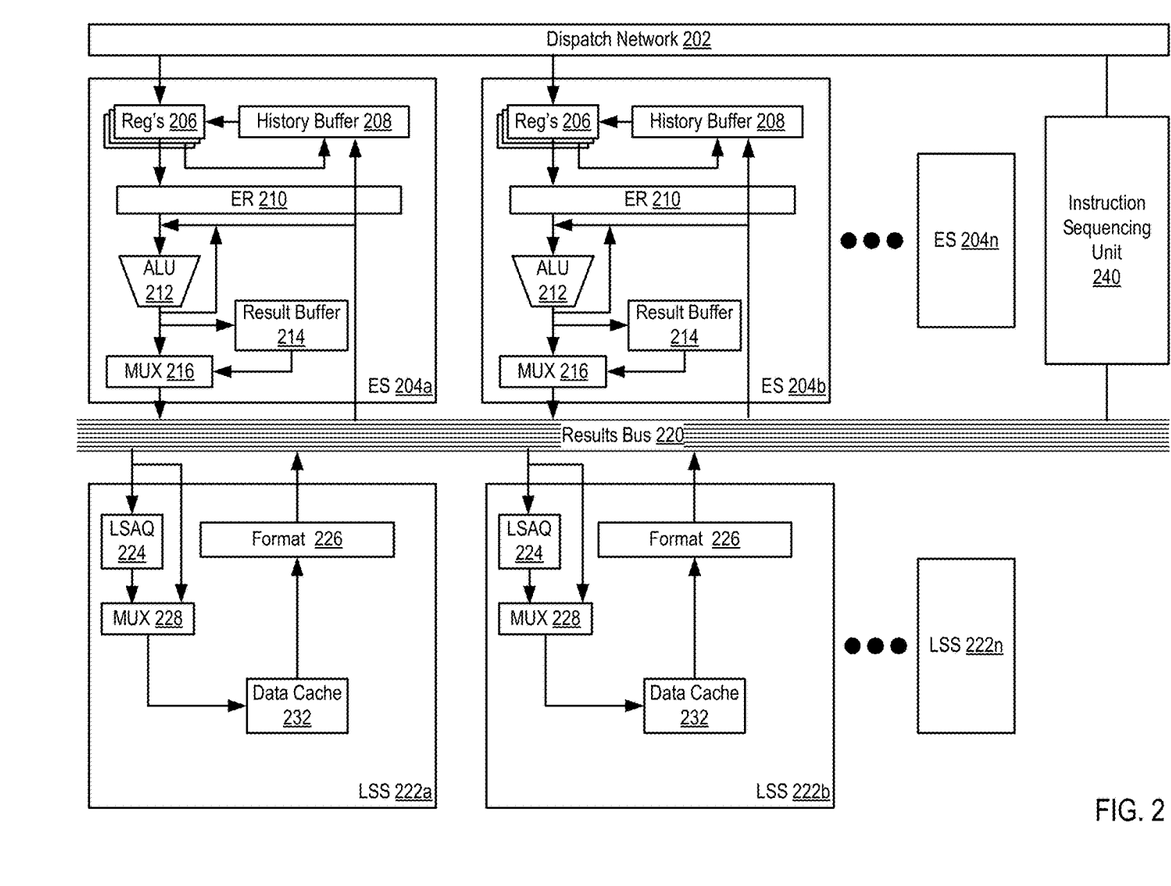
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
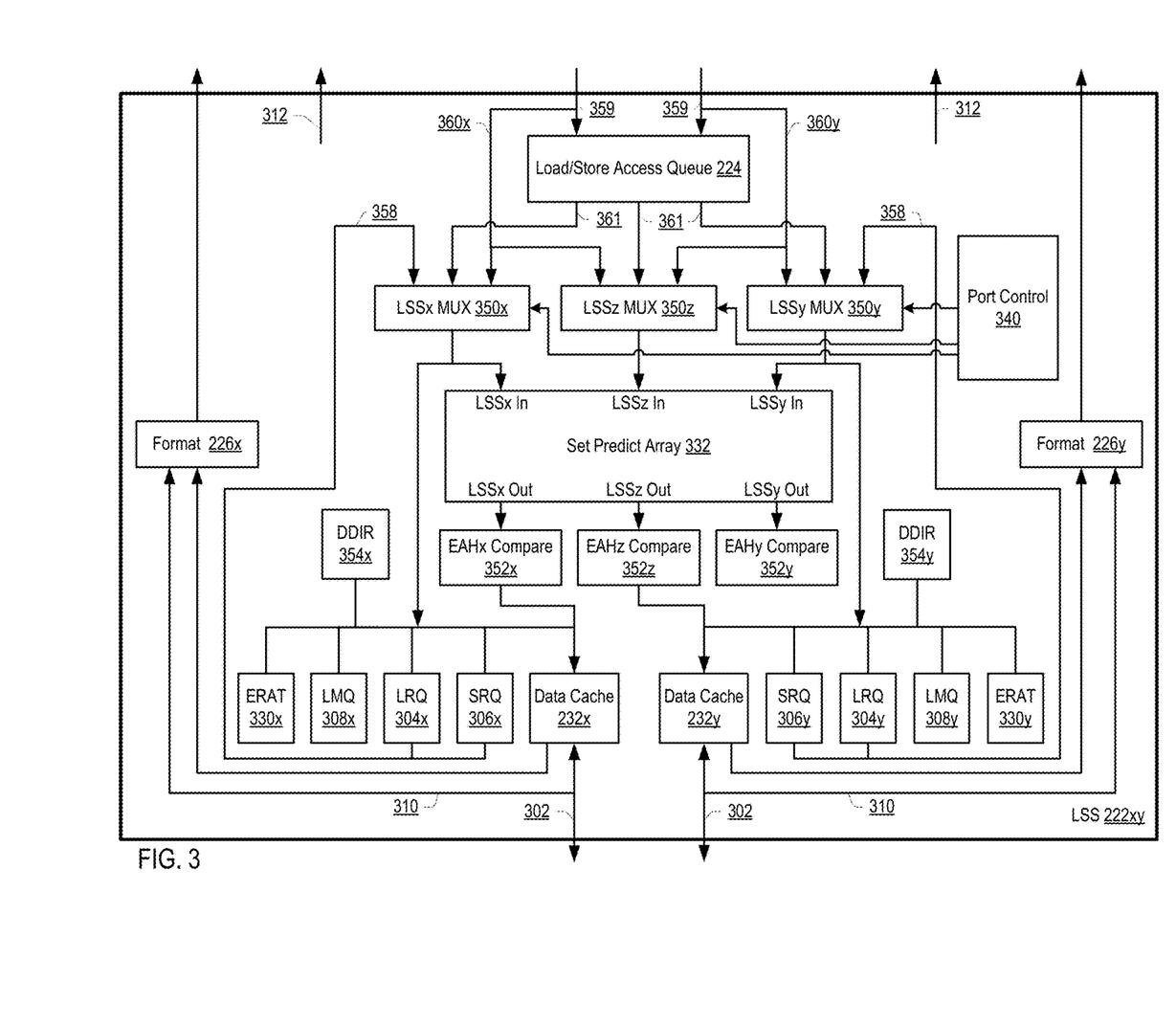
FIG. 3 sets forth a block diagram of a portion of a load/store superslice of a multi-slice processor, where the load/store superslice implements simultaneous two-target loads and stores according to different embodiments.

For further explanation, FIG. 3 sets forth a block diagram depicting an expanded view of a load/store superslice (222xy) configured to implement logic for supporting simultaneous processing of different combinations of a single-target loads, single-target stores, two-target loads, and two-target stores. The load/store superslice (222xy) includes architectural components for implementing two individual load/store slices such as load/store slice (222a) and load/store slice (222b) depicted in FIG. 2. The loads/store superslice (222xy) further includes a set predict array (332)

configured with additional ports and corresponding logic such that the additional ports and corresponding logic, referred to as "port logic," may allow simultaneous execution of combinations of load and store instructions that would not be possible with two load/store slices without the port logic—where the additional port logic is much less logic than is needed to implement an entire load/store slice.

For example, in some cases, a load instruction, such as a two-target load instruction, would entirely occupy two individual load/store slices without the additional port logic, which would prevent simultaneous execution of the two-target load instruction with another instruction. However, the two-target load instruction may not use all components of a second load/store slice, and therefore, with the addition of the port logic that includes much less silicon, space, and logic than the logic of an entire load/store slice, the two-target load instruction may be executed simultaneously with another instruction. In this way, different combinations of load and stores, which may have needed more than two load/store slices to execute simultaneously, may now execute simultaneously.

The simultaneous execution of different combinations of single-target and two-target loads and stores may depend, at least in part, on a store instruction not needing to use a data cache (232) simultaneously with a two-target load instruction—thereby allowing the two-target load instruction to use both data caches (232x, 232y). In this way, a two-target load instruction may be executed simultaneously with a store instruction without the addition of another data cache to support the store instruction.

A set predict array (332) generally includes logic for inputting, at a given port, an effective address and outputting, on a corresponding port, an effective address hash value that may be used to index into a data cache. While the effective address hash value may be highly accurate, the comparison logic (352x, 352y, 352z) receiving the output values of the set predict array may validate, or confirm to be correct, the accuracy of the output values by referencing a corresponding data cache directory ("DDIR") (354x, 354y) lookup for the same effective address input to the set predict array (332).

A load instruction may be a single-target load instruction or a two-target load instruction, where a single-target load instruction may be executed by a single load/store slice (222a), and where a two-target load instruction may be executed by two load/store slices (222a, 222b). For example, a two-target load instruction may specify bytes of data to load that are more than may be processed by a single load/store slice at a single time due to the data not being able to be loaded into a single load/store slice data cache at once. Similarly, a two-target store instruction may specify bytes of data to store that are more than may be processed by a single load/store slice at a single time.

The load/store superslice (222xy) includes components allowing for the implementation of two load/store slices that may each execute single-target loads and stores simultaneously. However, the additional port logic in excess of the logic for implementing the two load/store slices is configured such that the additional port logic, while being much less than the logic for implementing another entire load/store slice, allows for simultaneous execution of load and store instructions that would not otherwise be possible using simply two load/store slices. In other words, without the additional port logic, the logic for two load/store slices in a load/store superslice (222xy) may simultaneously process any two single-target load or single-target store instructions, but not any combination of two-target loads and two-target stores.

The additional port logic may include logic corresponding to the addition of an input port ("LSSz In") and an output port ("LSSz Out") for the set predict array (332), a port control (340) for determining input combinations to the set predict array (332), a MUX (350z) for handling a portion of a given two-target instruction, and comparison logic (352z) for analyzing output from the set predict array output port ("LSSz Out").

As noted above, the load/store superslice (222xy) may include logic for implementing two load/store slices. A first load/store slice may include load/store slice (LSS) MUX (350x), data cache directory (DDIR) (354x), data cache (232x), store request queue (306x), load reorder queue (304x), load miss queue (308x), effective address to real address translation (ERAT) (330x) cache, and format (226x) logic.

A second load/store slice may include load/store slice (LSS) MUX (350y), data cache directory (DDIR) (354y), data cache (232y), store request queue (306y), load reorder queue (304y), load miss queue (308y), effective address to real address translation (ERAT) (330y) cache, and format (226y) logic.

The load/store superslice (222xy) may further include logic that is shared, including the load/store access queue (224), the set predict array (332), port control (340) logic, load/store slice z (LSSz) MUX (350z), and comparison logic for effective address hash value x ("EAHx Compare") (352x), comparison logic for effective address hash value y ("EAHy Compare") (352y), and comparison logic for effective address hash value z ("EAHz Compare") (352z).

The load/store slice (222) may retrieve data from and store data to any tier of a memory hierarchy, beginning with a local data cache (232), and extending as far down in the hierarchy as needed to find requested data or to store data. Requested data, when received, may be provided to general purpose registers, virtual registers, or to some other destination. The received data may also be stored in a data cache (232) for subsequent access. The load/store slice (222) may also manage translations of effective addresses to real addresses to communicate with or access different levels of memory hierarchy.

A store reorder queue (306) may include entries for tracking the cache operations for sequential consistency and may reissue operations into the load/store pipeline for execution independent of an execution slice. For example, the store reorder queue (306) may signal the load/store access queue (224) to reissue an instruction.

A load miss queue (308) may issue requests for data to one or more data storage devices of a multi-tiered memory hierarchy, where a request for data may correspond to a load instruction for the data.

Responsive to the data being returned along the line (302) to the load/store slice (222), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222) and includes entries for tracking cache operations for sequential consistency, among other attributes. The load reorder queue (304) may also reissue operations into the load/store pipeline for execution, which provides operation that is independent of the execution slices. For example, the load reorder queue (304) may signal the load/store access queue (224) to reissue an instruction.

The effective address to real address translation (330) cache may be implemented on individual load/store slices, where the effective address to read address translation (330) cache may be indexed according to an effective address field of an instruction, where an indexed entry of the effective address to real address translation (330) cache may store a correspondingly mapped real address field.

A load/store slice (222), for a given load or store instruction specifying an effective or virtual address, may perform a translation from the effective address to a real address. Generally, translations from effective addresses to real addresses may go through multiple levels of translation— where a combination of the effective address to real address translation (330) cache, a translation lookaside buffer (not shown), and a page walk cache (not shown) may serve to store different results of previous address translations to speed future address translations. For example, effective address to real address translations may be stored within different tiers of memory having different performance characteristics, with a first tier being the effective address to real address translation (330) cache, a second tier being a translation lookaside buffer, a third tier being one or more page tables reachable through one or more page directories stored in a lower tier or tiers of processor memory. The effective address to real address translation (330) cache and the translation lookaside buffer may both cache results of previous address translations retrieved from stored page tables. The page walk cache may store results that allow the avoidance of performing a full page walk through every level of a multi-level address translation.

The load/store slice (222), in performing an effective address to real address translation for a load or store instruction, may first use an effective page number field of the effective address of the instruction to index the effective address to real address translation (330) cache. If there is a hit, then the entry for the hit provides the translation of an effective page number to a physical page number—where the real address used to access physical memory is comprised of the physical page number from the entry and an offset from an offset field of the effective address.

Otherwise, on a miss of the effective address to real address translation (330) cache, the load/store slice (222) may index the translation lookaside buffer using the effective page number of the effective address. If there is a hit, then the entry for the hit provides the translation for the effective page number of the effective address to physical page number.

Otherwise, on a miss of the translation lookaside buffer, the load/store slice (222) may perform a page walk of the multiple nested levels of address translation—where each level may correspond to a page directory indexed by a portion of the effective address ultimately leading to a page table storing effective to real translation addresses. The page directories and page tables may be read from lower tiers of processor memory.

Figure 4:
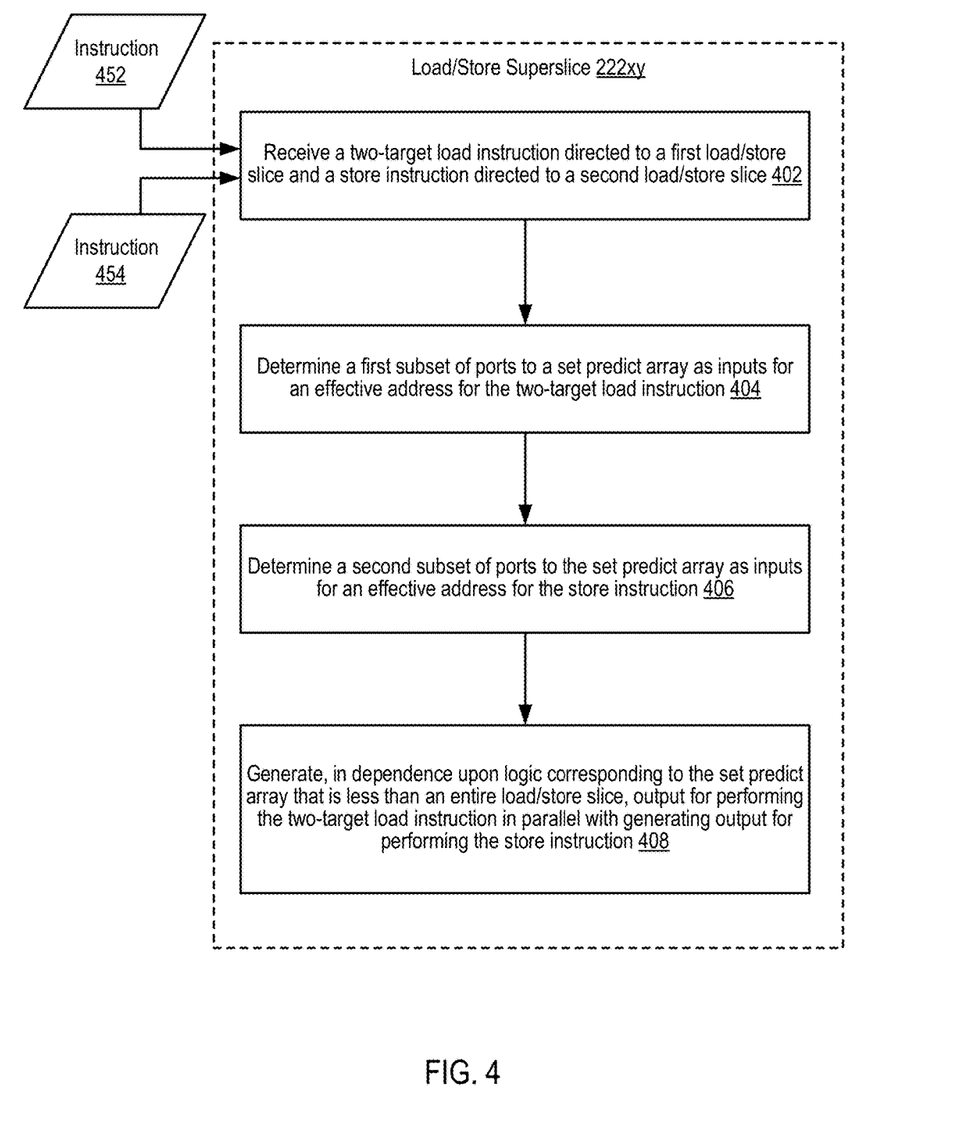
FIG. 4 sets forth a flow chart illustrating an exemplary method of operation of a multi-slice processor in which a load/store superslice is configured to implements simultaneous two-target loads and stores according to different embodiments.

For further explanation, FIG. 4 sets forth a flow chart illustrating an exemplary method of operation of a multi-slice processor implementing simultaneous two-target loads and stores. The method of FIG. 4 may be carried out by a multi-slice processor similar to that in the examples of FIGS. 1-3. Such a multi-slice processor may include a plurality of execution slices and a plurality of load/store superslices (220xy), where a load/store superslice (222xy) may include a set predict array (332), a first load/store slice, and a second load/store slice, as described above with regard to FIG. 3.

The method of FIG. 4 includes receiving (402) a two-target load instruction (452) directed to the first load/store slice and a store instruction (454) directed to the second load/store slice. Receiving (402) the two-target load instruction and the store instruction may be carried out by a load/store access queue (224) receiving, along one or more input lines (359) from a results bus (220), the two-target load instruction and receiving the store instruction—where the instructions may be received on respective input lines, and where the instruction may be received in parallel. Further, the instructions may be received from respective instruction sequencing units corresponding to respective execution slices, or the instructions may be received from a single instruction sequencing unit.

The method of FIG. 4 also includes determining (404) a first subset of ports to the set predict array (332) as inputs for an effective address for the two-target load instruction. Determining (404) the first subset of ports, {LSSx In, LSSz In}, may be carried out by the port logic (340) selecting two port inputs of the set predict array (332), LSSx In and LSSz In, to receive portions of the effective address of the two-target load instruction—where the inputs to the set predict array (332) may be determined according to outputs of two MUXs, LSSx MUX 350x and LSSz MUX 350z corresponding to the first subset of ports.

The outputs of LSSx MUX 350x and LSSz MUX 350z may be selected by the port control (340) logic identifying the load instruction as a two-target load instruction whose execution is dependent upon using the two data caches (232x, 232z)—where the output ports from the set predict array (332) corresponding to the two input ports for the two-target load instruction effective address, may feed into comparison logic components EAHx Compare (352x) and EAHz Compare (352z), and further where the comparison logic components (352x, 352z) validate the effective address hash value outputs from the set predict array (332) to ensure that an access to the data caches (232x, 232y) index into a correct location.

The port control logic (340) may select the input to the MUXs (350x, 350z) for the two-target load instruction through bypass line (360x) directly from the results bus, or, after one or more cycles, through an output (361) from the load/store access queue (224) that also receives the two-target load instruction. The port logic (340) may select the MUXs to receive the two-target load instruction simultaneously with selecting a MUX to receive a store instruction.

The method of FIG. 4 also includes determining (406) a second subset of ports to the set predict array (332) as inputs for an effective address for the store instruction. Determining (406) the second subset of ports, {LSSy In}, may be carried out by the port logic (340) selecting one port input of the set predict array (332), LSSy In, to receive portions of the effective address of the two-target load instruction— where the inputs to the set predict array (332) may be determined according to outputs of two MUXs, LSSy MUX 350y corresponding to the second subset of ports.

The output of LSSy MUX 350y may be selected by the port control (340) logic determining the store instruction as an instruction whose execution is not dependent upon using the two data caches (232x, 232y), and consequently, determining that the instruction may be executed simultaneously, or at least partially simultaneously, with the two-target load instruction—where the output port from the set predict array (332) corresponding to the input port for the store instruction effective address, may feed into comparison logic components EAHy Compare (352y), and further where the comparison logic component (352y) may validate the effective address hash value output from the set predict array (332).

The port control logic (340) may select the input to the MUX (350z) for the store instruction through bypass line (360y) directly from the results bus, or, after one or more cycles, through an output (361) from the load/store access queue (224) that also receives the store instruction. The port logic (340) may select the MUX to receive the two-target load instruction simultaneously with selecting MUXs to receive the two-target instruction. While in this example, the store instruction is a one-target store instruction, because neither a one-target store instruction or a two-target store instruction, would conflict with a one-target or two-target load instruction for use of the data caches, a two-target store instruction may also be processed similarly to a one-target store instruction.

The method of FIG. 4 also includes generating (408), in dependence upon logic corresponding to the set predict array (332) that is less than logic implementing an entire load/store slice, output for performing the two-target load instruction in parallel with generating output for performing the store instruction. Generating (408) the outputs may be carried out by the set predict array (332) processing each of the port inputs (LSSx In, LSSz In, LSSy In) in parallel, and also in parallel, generating hash value outputs for each of the input port values provided from the MUXs (350x, 350z, 350y), and propagating the generated hash value outputs to output ports corresponding to the input ports.

In this example, the generated hash value outputs for the two-target load instruction effective address are propagated to EAHx Compare (352x) and EAHz Compare (352z) based on inputs corresponding to input ports (LSSx In, LSSz In) corresponding to the effective address for the two-target load instruction. Similarly, the generated hash value output for the store instruction effective address is propagated to EAHy Compare (352y) based on inputs corresponding to input port (LSSy In) corresponding to the effective address for the store instruction. Further, the output values may be used for loading data into the data caches and for storing data to a memory location.

In this way, in dependence upon additional port logic corresponding to the extra ports on the set predict array (332), the load/store superslice (222xy) may simultaneously process a two-target load instruction and a store instruction.

Figure 5:
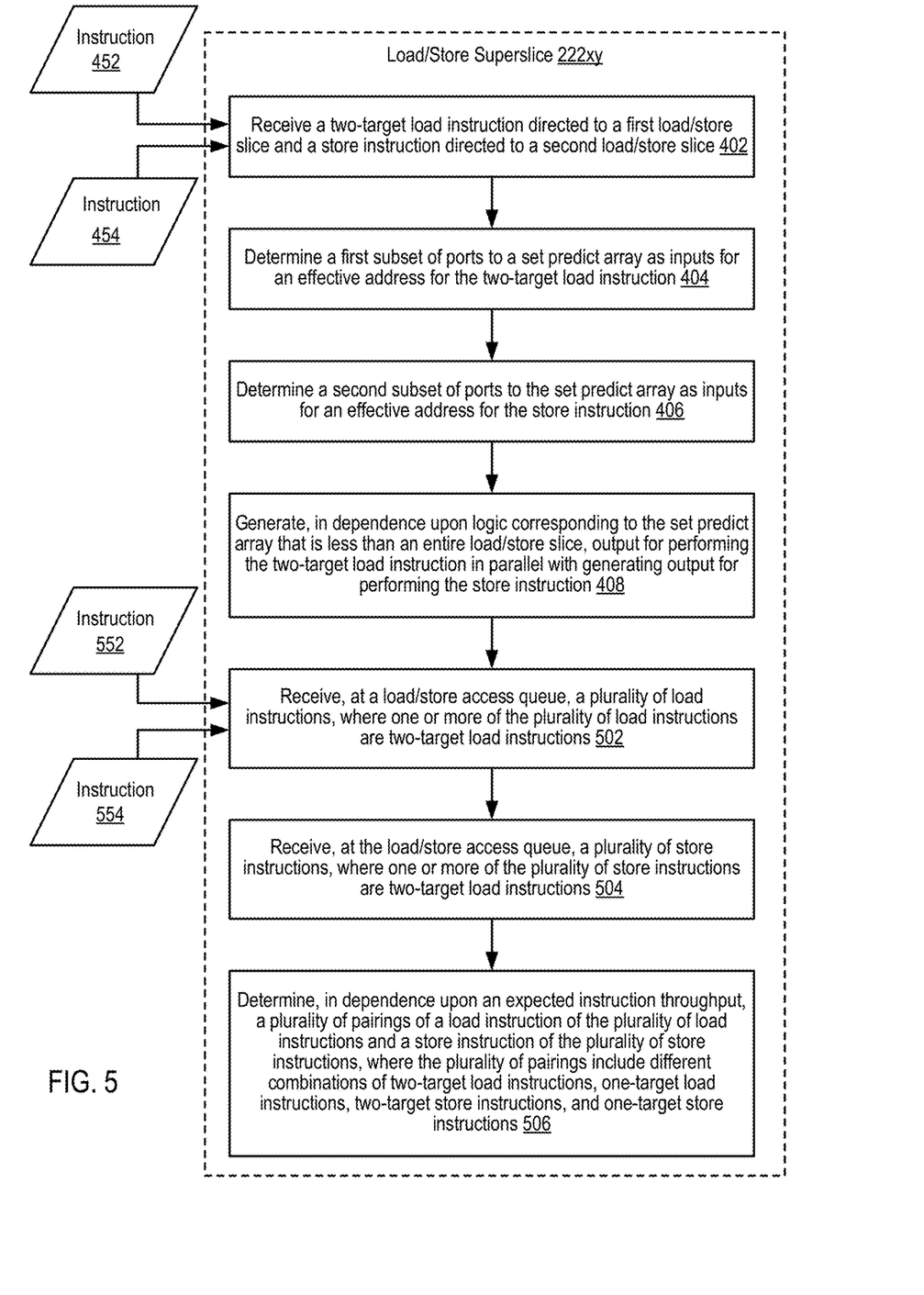
FIG. 5 sets forth a flow chart illustrating an exemplary method of operation of a multi-slice processor in which a load/store superslice is configured to implements simultaneous two-target loads and stores according to different embodiments.

For further explanation, FIG. 5 sets forth a flow chart illustrating an exemplary method of operation of a multi-slice processor implementing simultaneous two-target loads and stores. The method of FIG. 5 may be carried out by a multi-slice processor similar to that in the examples of FIGS. 1-3. Such a multi-slice processor may include a plurality of execution slices and a plurality of load/store superslices (220xy), where a load/store superslice (222xy) may include a set predict array (332), a first load/store slice, and a second load/store slice, as described above with regard to FIG. 3.

The method of FIG. 5 is similar to the method of FIG. 4 in that the method of FIG. 5 also includes: receiving (402) a two-target load instruction (452) directed to the first load/store slice and a store instruction (454) directed to the second load/store slice; determining (404) a first subset of ports to the set predict array (332) as inputs for an effective address for the two-target load instruction; determining (406) a second subset of ports to the set predict array (332) as inputs for an effective address for the store instruction; and generating (408), in dependence upon logic corresponding to the set predict array (332) that is less than logic implementing an entire load/store slice, output for performing the two-target load instruction in parallel with generating output for performing the store instruction.

The method of FIG. 5 differs from the method of FIG. 4, however, in that the method of FIG. 5 further includes: receiving (502), at the load/store access queue (224), a plurality of load instructions (552), where one or more of the plurality of load instructions are two-target load instructions; receiving (504), at the load/store access queue (224), a plurality of store instructions (554), where one or more of the plurality of store instructions are two-target store instructions; and determining (506), in dependence upon an expected instruction throughput, a plurality of pairings that include a load instruction of the plurality of load instructions and a store instruction from the plurality of store instructions, where the plurality of pairings include different combinations of two-target load instructions, one-target load instructions, two-target store instructions, and one-target store instructions.

Receiving (502) the plurality of load instructions may be carried out by the load/store access queue (224) receiving, and storing or queuing, load instructions received from the results bus. Further, the load instructions may be received from respective instruction sequencing units corresponding to respective execution slices, or the instructions may be received from a single instruction sequencing unit.

Receiving (504) the plurality of store instructions may be carried out by the load/store access queue (224) receiving, and storing or queuing, store instructions received from the results bus. Further, the store instructions may be received from respective instruction sequencing units corresponding to respective execution slices, or the instructions may be received from a single instruction sequencing unit. In this way, the load/store access queue (224) may store multiple different types of load and store instructions.

Determining (506) the plurality of pairings of load and store instructions may be carried out by the port logic (340) accessing the stored load and store instructions within the load/store access queue and pairing two-target (2TL) and one-target (1TL) load instructions with two-target (2TS) and one-target (1TS) store instructions, and within constraints of any possible dependencies, pairing possible combinations that may include {2TL, 1TS}, {2TL, 2TS}, {1TL, 1TL}— where the order is not relevant.

Some considerations in determining a pairing of instructions from the queued instructions in the load/store access queue (224) may include selecting pairs of oldest stores and oldest loads, selecting the oldest load with any age store. In other cases, the port logic (340) may select as many loads, regardless of age, within a cycle as possible, for example, two different one-target loads may be selected to launch before an older store instruction. In other examples, different pairings that result in a maximum, or in a relatively more efficient instruction throughput relative to other pairings, may be selected to increase an amount of instructions that may be launched an processed simultaneously. Such selection methodologies may prevent single-slice operations from being starved out due to servicing dual-slice operations.

Further considerations in determining a pairing of instructions from the queued instructions in the load/store access queue (224) may include prioritizing recycled load or store operations received from the load reorder queues or from the store reorder queues along lines (358) to be included in a pairing with another queued load or store operation. In some cases, the recycled operation may be selected based on an already determined operation. In another case, the recycled operation may be selected first, and the other operation in the pairing may be selected in dependence upon the selected recycled operation. In this way, recycled operations may be prevented from languishing, or being delayed, for too long.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices and a load/store superslice, wherein the load/store superslice comprises a set predict array, a first load/store slice, a second load/store slice, and wherein the method comprises:
   receiving a two-target load instruction directed to the first load/store slice and a store instruction directed to the second load/store slice;
   determining a first subset of ports of the set predict array as inputs for an effective address for the two-target load instruction;
   determining a second subset of ports of the set predict array as inputs for an effective address for the store instruction; and
   generating, in dependence upon logic corresponding to the set predict array, output for performing the two-target load instruction in parallel with generating output for performing the store instruction, wherein:
   the logic corresponding to the set predict array comprises less logic than logic required to implement an entire load/store slice; and
   the first load/store slice comprises a first load/store slice multiplexer, a first formatter, a first data cache directory, a first effective address to real address translation cache, a first load miss queue, a first load reorder queue, a first store reorder queue, and a first data cache, and wherein the second load/store slice comprises a second load/store slice multiplexer, a second formatter, a second data cache directory, a second effective address to real address translation cache, a second load miss queue, a second load reorder queue, a second store reorder queue, and a second data cache.

2. The method of claim 1, wherein the logic corresponding to the set predict array comprises port control logic configured to control inputs to ports of the set predict array, and wherein the set predict array further comprises an input port and an output port in addition to ports configured to support the first load/store slice and the second load/store slice.

3. The method of claim 2, further comprising the port control logic determining a first subset of ports to the set predict array and determining a second subset of ports to the set predict array.

4. The method of claim 1, wherein the load/store superslice performs, one or more functions of receiving the two-target load instruction in parallel with one or more functions of receiving the store instruction, and wherein the load/store superslice performs one or more functions of determining a first subset in parallel with one or more functions of determining a second subset.

5. The method of claim 1, wherein the two-target load instruction uses the first data cache of the first load/store slice in parallel with using the second data cache of the second load/store slice, and wherein the two-target load instruction is performed in parallel with the store instruction.

6. The method of claim 1, further comprising:
   receiving, at a load/store access queue of the load/store superslice, a plurality of load instructions, wherein one or more of the plurality of load instructions are two-target load instructions;
   receiving, at the load/store access queue, a plurality of store instructions, wherein one or more of the plurality of store instructions are two-target store instructions; and
   determining, in dependence upon an expected instruction throughput, a plurality of pairings of a load instruction from the plurality of load instructions with a store instruction of the plurality of store instructions, wherein the plurality of pairings include different combinations of two-target load instructions, one-target store instructions, two-target store instructions, and one-target load instructions.

* * * * *